United States Patent Office 3,083,215
Patented Mar. 26, 1963

3,083,215
PROCESS FOR PREPARING 16-ALKYL-Δ⁹,¹¹-PREGNENES
Frank A. Cutler, Jr., Westfield, and Meyer Sletzinger, North Plainfield, N.J., assignors to Merck & Co., Inc., Rahway, N.J., a corporation of New Jersey
No Drawing. Filed Jan. 30, 1959, Ser. No. 790,041
5 Claims. (Cl. 260—397.45)

This invention relates to a process for preparing 16-alkyl steroid compounds and to valuable intermediates produced thereby. More particularly it relates to a method for preparing 16-alkyl-9(11),16-pregnadiene compounds which are valuable intermediates in the preparation of highly active anti-inflammatory steroids, as, for example, 9α-fluoro-11β,17α,21-trihydroxy-16-methyl-1,4-pregnadiene-3,20-dione.

Methods are known by which 16α or 16β-alkyl steroids may be prepared. However, the known methods involve the use of costly and dangerous reagents such as organic peracids and diazomethane. For example, in one of the known methods for introducing a 17-hydroxyl substituent into a 16-alkyl-20-keto steroid, the 20-keto steroid is converted to the 20-enol acylate and the unsaturated enol acylate of the 20-keto steroid is treated with an organic peracid, e.g. perbenzoic acid, to convert the 17(20)-double bond into a 17(20)-epoxide which may be hydrolyzed to form a 17α-hydroxy-16-alkyl-20-keto steroid. Other methods used in the preparation of 16β-alkyl steroids involves the treatment of a 16-pregnen-20-one compound with a diazoalkane such as diazomethane and subsequently, pyrolysis of the alkyleneazo compound formed. The reagents described are not only dangerous to employ, but very costly to prepare and, thus the method which avoids the use of either or both of these reagents is very desirable.

It is an object of this invention to provide processes for the preparation of 16-alkyl-16-pregnene compounds which avoid the use of the costly reagents previously employed. A further object is the provision of a simple process for the preparation of 16-alkyl-9(11),16-pregnadiene compounds. Such compounds may be used in the preparation of either 16α-alkyl or 16β-alkyl steroids. Other objects more specifically described will be apparent from the detailed description of the invention which follows.

In accordance with our invention it has now been found that 3-hydroxy (or acyloxy)-16-alkyl-9(11)-pregnen-20-one compounds or their 20-enol derivatives are brominated to produce the corresponding 17-bromo-3-hydroxy (or acyloxy)-16-alkyl-9(11)-pregnen-20-one compounds or 17,21-dibromo-3-hydroxy (or acyloxy)-16-alkyl-9(11)-pregnen-20-one compounds which are then dehydrobrominated to produce 3-hydroxy (or acyloxy)-16-alkyl-9(11),16-pregnadiene-20-one compounds.

The bromination of the 3-hydroxy (or acyloxy)-16-alkyl-9(11)-pregnen-20-one compounds to produce the corresponding 17-monobromo or 17,21-dibromo derivatives is ordinarily conducted by contacting a solution of the steroid with a solution of bromine in the presence of a strong acid catalyst. Solvents for the bromination reaction may be chlorinated hydrocarbons such as chloroform, acetic acid or mixtures of these with a lower alkanol such as methanol. The acid catalyst may be any strong non-oxidizing acid which will not degrade the steroid molecule. Acids such as hydrobromic acid, p-toluene sulfonic acid, 3,5-dinitrobenzenesulfonic acid are satisfactory for this purpose. The temperature of the bromination may be varied between about 30 to 100° C. inclusive, although it is preferably maintained at about 45 to 50° C. in order to effect the best yields of bromo compound. When the 20-enol derivative is the compound brominated it is preferred to carry out the bromination in the presence of a tertiary amine using excess bromine.

When a molar ratio of about 2 moles of bromine to 1 mole of 20-keto steroid is employed the 17,21-dibromo derivative results and when the 20-enol derivative of the 20-keto steroid is brominated the 17-monobromo steroid is the compound isolated. Thus, when the 20-enol derivatives are employed as, for example, the 20-magnesium enolate of 3-acetoxy-16α-methyl-9(11),17(20)-pregnadine, the 20-cadmium enolate of 3-acetoxy-16α-methyl-9(11),17(20)-pregnadiene and 3,20-diacyloxy-16α-methyl-9(11),17(20)-pregnadiene and are contacted with excess bromine in an alkaline medium, the compound obtained on isolation is 3-acetoxy-16α-methyl-17α-bromo-9(11)-pregnen-20-one. When the steroid employed is the 20-ketone, e.g. 3-acetoxy-16α-methyl-9(11)-pregnen-20-one and a molar ratio of 2 moles of bromine to 1 of steroid is used the compound obtained after bromination and isolation is 17α,21-dibromo-3-acetoxy-16α-methyl-9(11)-pregnen-20-one.

The second step of our process involves the treatment of a 17-bromo steroid, for example, a 17-bromo-3-hydroxy (or acyloxy)-16-alkyl-9(11)-pregnen-20-one or a 17,21-dibromo-3-hydroxy (or acyloxy)-16-alkyl-9(11)-pregnen-20-one with a dehydrobrominating agent to form the corresponding 9(11),16-pregnadiene compound. In the case of the 17-monobromo intermediate the compound is ordinarily contacted with a dehydrobrominating agent, e.g. a tertiary amine such as pyridine, lithium chloride in an N,N-diloweralkylamide such as dimethylformamide, or dimethylformamide alone, to form directly the 3-acyloxy-16-alkyl-9(11)-pregnen-20-one. When this reaction is carried out in the presence of a tertiary amine such as pyridine, it is ordinarily conducted by maintaining the reaction mixture at the reflux temperature for a period of several hours, following which the product may be recovered by precipitation with water and crystallization from an organic solvent.

When the brominated intermediate employed is a 17,21-dibromo steroid as, for example, 17,21-dibromo-3-acetoxy-16α-methyl-9(11)-pregnen-20-one, the preferred method of dehydrobromination is to contact an organic solvent solution of the steriod for a brief period of time with at least two moles of an alkali metal iodide. The organic solvent employed is not critical and may be a lower aliphatic ketone, a lower alkanol or mixtures thereof with an aromatic hydrocarbon, e.g. acetone, methanol and benzene. Upon completion of the reaction the formed sodium bromide, which arises as a by product, may be removed by filtration although it is not necessarily desirable to do so, and the organic solvent is removed by evaporation under vacuo, leaving a residue comprising as the principle component, 3-acetoxy-16α-methyl-9(11),16-pregnadiene-20-one with a small amount of the 17-bromo-3-acetoxy-16α-methyl-9(11)-pregnen-20-one remaining as a byproduct of the reaction. The 17-monobromo may be converted to the desired pregnadiene compound by a further treatment with a tertiary amine as described in the preceding paragraph. The temperature at which the treatment with sodium iodide is effected is not critical and may vary between about 40° C. and the reflux temperature of the reaction mixture, temperatures ranging between about 40 to 60° C. being preferable.

Utilizing as the brominated steroid intermediate 17-bromo-3-hydroxy-(or acyloxy)-16-alkyl-9(11)-pregnen-20-one, e.g. 17-bromo-3-acetoxy-16α-methyl-9(11)-pregnen-20-one, the product obtained is 3-acetoxy-16-methyl-9(11),16-pregnadien-20-one. When a 17,21-dibromo intermediate is contacted with sodium iodide, the corresponding 9(11),16-pregnadiene product is obtained as the major component. Thus, for example, when 17α,21-dibromo-3-acetoxy-16α-methyl-9(11)-pregnen - 20 - one is contacted with sodium iodide the major product obtained is 3-acetoxy-16-methyl-9(11),16-pregnadien-20-one associated with a small amount of the byproduct, 17-bromo-3-acetoxy-16α-methyl-9(11)-pregnen-20-one which may be dehydrobrominated by subsequent treatment with refluxing pyridine to produce 3-acetoxy-16-methyl-9(11),16-pregnadien-20-one.

The following examples are intended to be illustrative of the invention claimed and therefore, the invention is not necessarily limited thereto.

EXAMPLE 1

*3α-Acetoxy-16-Methyl-9(11),16-Pregnadien-20-One*

To a solution 1 g. (2.7 mm.) of 3α-acetoxy-16α-methyl-9(11)-pregnen-20-one in 50 ml. of chloroform at 45–47° C. is added 13.7 ml. (5.4 mm.) of 0.395 M bromine in chloroform over a period of 130 minutes. After a 15 minute aging period the solution is cooled to room temperature, washed with 40 ml. of 10% sodium bicarbonate solution and two 75 ml. portions of water. The solution is dried over magnesium sulfate and evaporated. The residue comprising the 17,21-dibromide is dissolved in 25 ml. of warm acetone to which 1.5 g. sodium iodide has been added and allowed to stand at room temperature for a half-hour. The mixture is filtered from precipitated sodium bromide and the filtrate is evaporated under reduced pressure and below 30° C. The residue is distributed between 25 ml. of ether and 25 ml. of 10% sodium bisulfite solution. The system is shaken intermittently until the iodine color fails to return to the ether phase. The ether phase is then washed with two 25 ml. portions of 2% sodium carbonate solution and two 50 ml. portions of water. The ether solution is dried over magnesium sulfate and evaporated, leaving a residue comprising the 17-monobromide. The monobromide is disolved in 15 ml. of dry pyridine and heated at the reflux temperature for six hours. The solution is cooled, diluted with 75 ml. of water, and extracted with three 50 ml. portions of chloroform. The combined chloroform extract is washed successively with 75 ml. of water, two 50 ml. portions of dilute hydrochloric acid, two 50 ml. portions of 10% sodium bicarbonate solution, and three 75 ml. portions of water. The chloroform solution is evaporated under reduced pressure leaving a residue comprising 3α-acetoxy-16-methyl-9(11),16-pregnadien-20-one and showing $\lambda_{max.}^{methanol}$ at 252 mμ, A%=121

The residue is chromatographed on 20 g. of acid-washed alumina to yield in the later benzene eluates and early 2:1 benzene:chloroform eluates after crystallization from Skellysolve B, 3α-acetoxy-16-methyl-9(11),16-pregnadien-20-one, M.P. 124.5–126.5°, undepressed on admixture with a specimen prepared as in Example 2.

Similarly, following the procedure outlined above, and using as the steroid starting material 3-hydroxy-16α-methyl-9(11)-pregnen-20-one the product obtained after bromination is 17,21-dibromo-3-hydroxy-9(11)-pregnen-20-one which is dehydrobrominated with sodium iodide to produce 3 - hydroxy-16-methyl-9(11),16-pregnadien-20-one. Other esters may also be conveniently employed in this bromination and dehydrobromination procedure as, for example, the propionate, the butyrate, the benzoate, the products obtained after bromination and dehydrobromination are the corresponding propionates, butyrates and benzoates. Other 16-alkyl steroids, 3-acetoxy-16-ethyl-9(11)-pregnen-20-one, 3-acetoxy-16-propyl - 9(11)-pregnen-20-one and 3-acetoxy-16-butyl-9(11)-pregnen-20-one may be treated according to the above procedures to produce the corresponding 17,21 - dibromo-16-alkyl steroid and the 16-alkyl-9(11),16-pregnadiene steroids.

EXAMPLE 2

*3α-Acetoxy-16-Methyl-9(11),16-Pregnadien-20-One*

A solution of 3α-hydroxy-16-methyl-9(11),16-pregnadien-20-one in 1 ml. of pyridine and 1 ml. of acetic anhydride is heated 1 hour on the steam bath. The solution is then cooled and diluted slowly with water to a volume of 10 ml. The resulting suspension of crystals is chilled and filtered. After washing with water and drying, the crude 3α-acetoxy-16-methyl - 9(11),16 - pregnadien-20-one melted at 125–128.5°. A 0.200 g. portion is recrystallized from 2 ml. of Skellysolve B; yielding 0.175 g. of crystals, M.P. 128–130°, showing $\lambda_{max.}^{methanol}$ at 251 mμ, A%=225

EXAMPLE 3

*17,21-Dibromo-3α-Acetoxy-16α-Methyl-9(11)-Pregnen-20-one*

To a solution of 10 g. (0.027 mole) of 3α-acetoxy-16α-methyl-9(11)-pregnen-20-one in 100 ml. of chloroform at 40–50° is added 55 ml. (0.054 mole) of 0.98 M bromine-in-chloroform over a period of 115 minutes. After a further aging period of 20 minutes, the solution is cooled to room temperature and washed successively with 100 ml. of 10% sodium bicarbonate solution and two 100 ml. portions of water. After drying over magnesium sulfate the chloroform solution is concentrated to a syrup under reduced pressure. The residue is triturated with 50 ml. of acetone and the resulting suspension of crystals of 17,21-dibromo-3α-acetoxy-16α-methyl-9(11)-pregnen-20-one is chilled and filtered. The crystals after washing with cold acetone and drying weighed 7.58 g; M.P. 196–205° (dec.). A specimen crystallized three times further from acetone melted at 216–219° (dec.).

EXAMPLE 4

*3α-Acetoxy-16-Methyl-9(11),16-Pregnadien-20-One*

A solution of 1 g. (1.9 mm.) of crude 17,21-dibromo-3α-acetoxy-16α-methyl-9(11)-pregnen-20-one prepared as in Example 3 and 1 g. of sodium iodide in 25 ml. of acetone is refluxed for two hours, developing an iodine color and precipitating sodium bromide. The suspension is cooled to room temperature and filtered. The sodium bromide thus collected weighed 0.39 g. (3.8 mm.). The filtrate is concentrated under reduced pressure and the residue is distributed between 50 ml. of ether and 50 ml. of 10% sodium bisulfite solution to remove iodine. There is no return of iodine color in the organic phase as is usual when 21-iodo-20-ketosteroids are present. The ether phase is washed with two 50 ml. portions of 2% sodium carbonate solution and two 50 ml. portions of water. Drying of the ether solution over magnesium sulfate and evaporation gives crude 3α-acetoxy-16-methyl-9(11),16-pregnadien-20-one, $\lambda_{max.}^{methanol}$ at 251 mμ, A%=129

The material melted at 90–112° and darkened and decomposed at 180–200° suggesting the presence of traces of halogen. The entire product (0.72 g.) is therefore dissolved in 10 ml. of dry pyridine and heated at the reflux temperature for six hours. The solution is then cooled to room temperature and diluted with 50 ml. of water, yielding a suspension of crystals. After chilling, the crystals are collected, washed with water, and dried; M.P. 109–118° C;

$\lambda_{max.}^{methanol}$ at 251 mμ, A%=180

Recrystallization of 0.5 g. of this material from 2 ml. of Skellysolve B gives 3α-acetoxy-16-methyl-9(11),16-pregnadien-20-one; M.P. 117–123.5°;

$\lambda_{max.}^{methanol}$ at 251 mμ, A%=199

EXAMPLE 5

*3α-Acetoxy-16-Methyl-9(11),16-Pregnadien-20-One*

PART 1.—PREPARATION OF 3α,20-DIACETOXY-16α-METHYL-9(11),17(20)-PREGNADIENE

A solution of 5 g. of 3α-acetoxy-16α-methyl-9(11)-pregnen-20-one in 50 ml. of acetic anhydride and 200 ml.

of toluene containing 0.5 g. of 2,4-dinitrobenzenesulfonic acid is heated at the reflux temperature for 17 hours. The solution is then cooled to room temperature and after removal of 38.6 ml. in samples, 1.0 g. of potassium acetate is added. The mixture is concentrated to a syrup comprising 3α,20 - diacetoxy-16-methyl-9(11),17(20) - pregnadiene. This is used directly in Part 2.

PART 2.—PREPARATION OF 17-BROMO-3α-ACETOXY-16α-METHYL-9(11)-PREGNEN-20-ONE

After removal of a sample, the remainder of the enol acetate prepared in Part 1 is dissolved in 78.2 ml. of glacial acetic acid and 11.7 ml. of dry pyridine. To the solution at room temperature over a period of an hour is added 20 ml. of 0.386 N bromine in acetic acid. Then water and ice totaling about 100 g. are added, giving a suspension of solid. This is collected, washed, and dried and comprised 17-bromo-3α-acetoxy-16α-methyl-9(11)-pregnen-20-one.

PART 3—DEHYDROBROMINATION

A solution of 1.0 g. of product prepared in Part 2 in 10 ml. of pyridine is heated at the reflux temperature for six hours. The solution is cooled, diluted with 50 ml. of water and extracted with three 50 ml. portions of chloroform. The combined chloroform extracts are washed successively with 100 ml. of dilute hydrochloric acid, 100 ml. of 10% sodium bicarbonate solution, and two 100 ml. portions of water. After drying over anhydrous magnesium sulfate the chloroform is evaporated leaving a residue of crude 3α-acetoxy-16-methyl-9(11),16-pregnadiene-20-one, $\lambda_{max.}^{methanol}$ at 251 m$\mu$, A%=114

EXAMPLE 6

3α-Acetoxy-16-Methyl-9(11),16-Pregnadien-20-One

To a stirred suspension of 13.9 g. of anhydrous cadmium chloride and 0.705 g. of anhydrous cuprous chloride in 70.5 ml. of anhydrous ether under a nitrogen atmosphere is added over a 5-minute period 46.75 ml. of 3 M methyl magnesium iodide in ether. The solution is heated at the reflux temperature for 90 minutes to form the methyl cadmium derivative. A solution of 6.42 g. of 3α-acetoxy-9(11),16-pregnadien-20-one in 275 ml. of anhydrous ether is then added with stirring over 15 minutes, and the mixture is allowed to stir nineteen hours. A precipitate of the 20-cadmium enol derivative of 3α-acetoxy - 16α - methyl - 9(11),17(20)-pregnadiene forms. The suspension is filtered through a fritted disc built into the vessel, the solids are washed with ether (100 ml.), and the solid is then resuspended in 200 ml. of benzene containing 5 ml. of dry pyridine. A solution of 47 ml. of 0.383 M bromine in benzene is added and the mixture is stirred at room temperature for 4 hours. To the reaction mixture is added 150 ml. of 10% sodium bisulfite solution and sufficient dilute hydrochloric acid to dissolve all solids. The benzene phase is separated, washed with 300 ml. of dilute hydrochloric acid, two 200 ml. portions of 10% sodium bicarbonate and two 300 ml. of water. After drying over magnesium sulfate, the benzene solution is evaporated. The residue on trituration with ether deposited material decomposing at 180°. The residue on boiling in 15 ml. of methanol and chilling, gives solid M.P. 124–130° (dec.). A gram of the latter material, comprising 17-bromo-3α-acetoxy-16α-methyl-9(11)-pregnen-20-one dissolved in 10 ml. of dry pyridine is heated at the reflux temperature for six hours, then cooled, and diluted with 50 ml. of water. The resulting crystals after chilling are collected, washed and dried. The presence of 3α - acetoxy-16-methyl-9(11),16-pregnadien-20-one is shown by the ultraviolet absorption;

$\lambda_{max.}^{methanol}$ at 251 m$\mu$, A%=46

EXAMPLE 7

Preparation of 16α-Methyl-3-Acetoxy-9(11)-Pregnen-20-One

To a suspension of 2.17 g. of cadmium chloride and 0.11 of cuprous chloride in 11 ml. of ether is added 7.3 ml. of 3 molar methylmagnesium iodide in ether. The mixture is boiled under reflux under nitrogen for one and one-half hours. To the mixture is added a solution of 1 g. of 3-acetoxy-9(11),16-pregnadien-20-one in 43 ml. of ether and the mixture refluxed with stirring for 16 hours. After decomposition of the mixture in the usual manner and recrystallization of the crude product from petroleum ether, there is obtained 0.8 g. of 16α-methyl-3-acetoxy-9(11)-pregnen-20-one, M.P. 146–148° C.

EXAMPLE 8

3α-Propionoxy-16-Methyl-9(11),16-Pregnadien-20-One

To a solution of 10 g. of 3α-propionoxy-16α-methyl-9(11)-pregnen-20-one in 100 ml. of chloroform at 5–10° is added 53.6 ml. of 0.964 M bromine in chloroform over a period of 75 minutes. The solution is washed with 100 ml. of 10% sodium bicarbonate solution, and 200 ml. of water. After drying over magnesium sulfate, the chloroform solution is evaporated to dryness to give a crystalline residue of 17α,21-dibromo-3α-propionoxy-16-methyl-9(11)-pregnen-20-one in essentially quantitative yield.

Three grams of the above dibromoketone is treated according to the procedures described in Example 4 to produce 3α - propionoxy-16-methyl-9(11),16-pregnadien-20-one.

The starting compounds of our invention, the 3-hydroxy (or acyloxy)-16-alkyl-9(11)-pregnen-20-ones are conveniently prepared from the known 3,11β-dihydroxy pregnan-20-one or the 3-acylate thereof, by brominating said 3,11β-dihydroxy pregnan-20-one or the 3-ester thereof in the presence of a strong acid catalyst to obtain 17,21-dibromo-3-hydroxy-9(11)-pregnen-20-one or a 3-ester thereof; contacting the thus obtained 17,21-dibromo-3-hydroxy-(11)-pregnen-20-one or 3-ester thereof with sodium iodide in refluxing acetone to form 17-bromo-3-hydroxy-9(11)-pregnen-20-one or 3-ester thereof and contacting said 17-bromo-3-hydroxy-9(11)-pregnen-20-one or 3-ester thereof with refluxing pyridine to obtain 3-hydroxy-9(11),16-pregnadien-20-one or the corresponding 3-ester thereof followed by treatment with methyl magnesium iodide in the presence of cuprous chloride thereby forming 16α-methyl-3-acetoxy-9(11)-pregnen-20-one or the corresponding 3-hydroxy compound. These procedures are described in more detail in an application of which one of the present inventors is co-inventor, Serial No. 748,178, filed July 14, 1958, now U.S. Patent No. 3,013,031.

The products obtained according to the process of this invention, e.g. 3-hydroxy (or acyloxy)-16-alkyl-9(11),16-pregnadien-20-one are useful as intermediates in the preparation of steroids which have valuable anti-inflammatory activity, as for example, 9α-fluoro-11β,17α,21-trihydroxy-16α-methyl-1,4-pregnadiene-3,20-dione. Thus, the products of our invention, i.e., 3-hydroxy(or acetoxy)-16-methyl-9(11),16-pregnadien-20-one is contacted with alkaline hydrogen peroxide to produce 3-hydroxy-16,17-oxido-16-methyl-9(11)-pregnen-20-one which is converted by hydrogenation under acid conditions to a mixture of 3,17α-dihydroxy-16α-methyl-9(11)-pregnen-20-one and 3,17α - dihydroxy - 16β-methyl-9(11)-pregnen-20-one which mixture may be conveniently separated by chromatography and crystallization into the respective 16α-methyl and 16β-methyl isomer. The latter compounds are reacted with bromine and chloroform to form 21-bromo-3α,17α - dihydroxy-16α-methyl-9(11)-pregnen-20-one and the corresponding 16β-methyl isomer which are reacted with sodium iodide in acetone to produce 21-iodo-3α,17α-dihydroxy-16α-methylpregnan-20-one and the corresponding 16β-methyl isomer which are converted without isolation to 21acetoxy-3α,17α-dihydroxy-16α-methyl-9(11)-pregnen-20-one and the corresponding 16β-methyl isomer by reaction with anhydrous potassium acetate; these compounds are then reacted with chromium trioxide in pyridine to form 21-acetoxy-17α-hydroxy-16α-methyl-9(11)-pregnene-3,20-dione and the corresponding 16β-methyl isomer. The latter compounds are then converted to the corresponding 1,4,9(11)-pregnatriene compounds by contacting them with selenium dioxide or the dehydrogenating activity of microorganisms, for example, *Nocardia asteroides* (ATCC 9970). The products thus obtained are 17α,21-dihydroxy-16α-methyl-1,4,9(11)-pregnatriene-3,20-dione and the corresponding 16β-methyl isomer which are acetylated on reaction with acetic anhydride and pyridine to give the corresponding 21-acetoxy compounds; the latter compounds are reacted with hypobromus acid to produce 9α-bromo-21-acetoxy-11β,17α-dihydroxy-16α-methyl-1,4-pregnadiene-3,20-dione and the corresponding 16β-methyl isomer which are reacted with anhydrous potassium acetate in ethanol to produce 21-acetoxy-9(11)-epoxy-17α-hydroxy-16α-methyl-1,4-pregnadiene-3,20-dione and the corresponding 16β-methyl isomer. These 9(11)-epoxy compounds are then reacted with hydrogen fluoride in tetrahydrofuran to produce 9α-fluoro-21-acetoxy-11β,17α-dihydroxy-16α-methyl-1,4-pregnadiene-3,20-dione and the corresponding 16β-methyl isomer; these compounds are reacted with a hydrolyzing agent to form 9α-fluoro-11β,17α,21-trihydroxy-16α-methyl-1,4-pregnadiene-3,20-dione and the corresponding 16β-methyl isomer.

Various changes and modifications may be made carrying out the present invention without departing from the spirit and scope thereof. Insofar as these changes and modifications are within the purview of the annexed claims, they are to be considered as part of our invention.

We claim:

1. The process which comprises contacting a member selected from the group consisting of compounds of the formulas:

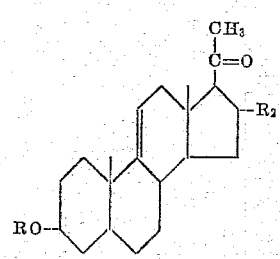

and

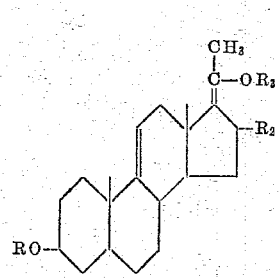

wherein R is a member selected from the group consisting of hydrogen and lower alkanoyl, $R_2$ is a lower alkyl substituent, and $R_3$ is a lower alkanoyl substituent, with bromine in a molar ratio of from about 1–2 moles of bromine per mole of steroid compound at a temperature of from about 30° C. to 100° C., thereby forming a 17-bromo steroid of the formula:

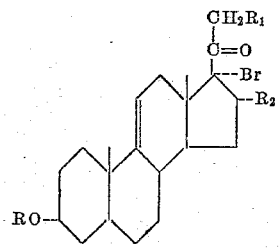

wherein R is a member selected from the group consisting of hydrogen and acyl, $R_1$ is a member selected from the group consisting of hydrogen and bromine, and $R_2$ is a lower alkyl substituent.

2. The process which comprises contacting a member selected from the group consisting of cadmium 20-enol derivatives of the formula:

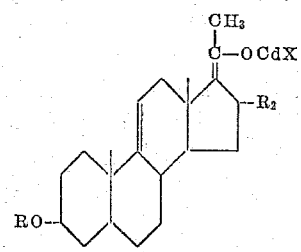

wherein R is a member selected from the group consisting of hydrogen and lower alkanoyl, X is a halogen, and $R_2$ is a lower alkyl substituent, with bromine in a molar ratio of from about 1–2 moles of bromine per mole of steroid compound at a temperature of from about 30° C. to 100° C. to form a 17-bromo steroid of the formula:

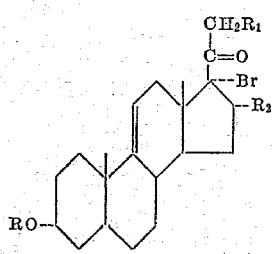

wherein R is a member selected from the group consisting of hydrogen and acyl, $R_1$ is hydrogen, and $R_2$ is a lower alkyl substituent.

3. The process which comprises contacting a member selected from the group consisting of magnesium 20-enol derivatives of the formula:

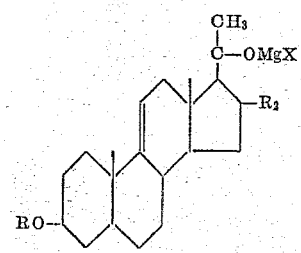

wherein R is a member selected from the group consisting of hydrogen and lower alkanoyl, X is a halogen, and $R_2$ is a lower alkyl substituent, with bromine in a molar ratio of from about 1–2 moles of bromine per mole of steroid compound at a temperature of from about 30° C. to 100° C. to form a 17-bromo steroid of the formula:

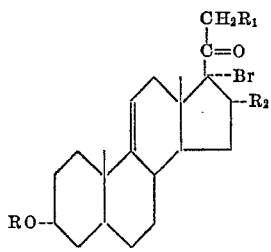

wherein R is a member selected from the group consisting of hydrogen and acyl, $R_1$ is hydrogen, and $R_2$ is a lower alkyl substituent.

4. The process which comprises contacting a member selected from the group consisting of compounds of the formula:

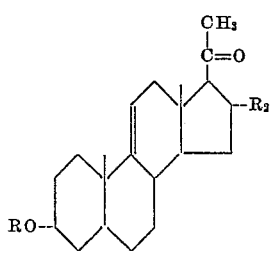

wherein R is a member selected from the group consisting of hydrogen and lower alkanoyl, and $R_2$ is a lower alkyl substituent, with bromine in a molar ratio of from about 1-2 moles bromine per mole of steroid compound at a temperature of from about 30° C. to 100° C. to introduce bromine into the 17-position and form a 17-bromo steroid of the formula:

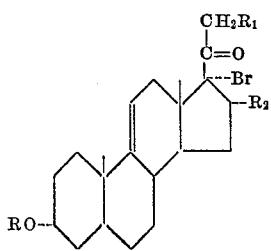

wherein R is a member selected from the group consisting of hydrogen and acyl, $R_1$ is a member selected from the group consisting of hydrogen and bromine, and $R_2$ is a lower alkyl substituent.

5. The process which comprises contacting a 17,21-dibromo-9(11)-pregnene compound of the formula:

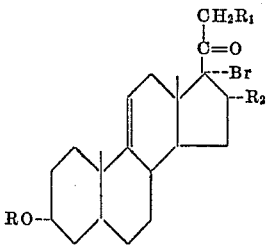

wherein R is a member selected from the group consisting of hydrogen and lower alkanoyl, $R_1$ is bromine, and $R_2$ is a lower alkyl substituent, with sodium iodide to form a 9(11),16-pregnadiene compound of the formula:

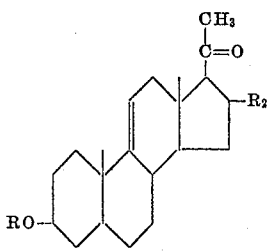

wherein R is a member selected from the group consisting of hydrogen and acyl, and $R_2$ is a lower alkyl substituent.

References Cited in the file of this patent
UNITED STATES PATENTS 2,752,341    Magerlein _____ June 26, 1956
3,013,031    Cutler et al. _____ Dec. 12, 1961

OTHER REFERENCES

Marker et al.: J.A.C.S. 64, 1280 (1942).